US005313573A

United States Patent [19]

Takahama

[11] Patent Number: 5,313,573

[45] Date of Patent: May 17, 1994

[54] APPARATUS FOR FORMING CHARACTER PATTERNS WITH LINE SEGMENTS

[75] Inventor: Kazuhide Takahama, Shizuoka, Japan

[73] Assignee: Tokyo Electric Co., Ltd., Tokyo, Japan

[21] Appl. No.: 106,318

[22] Filed: Aug. 13, 1993

Related U.S. Application Data

[63] Continuation of Ser. No. 577,897, Sep. 5, 1990, abandoned.

[30] Foreign Application Priority Data

Sep. 8, 1989 [JP] Japan ................................ 1-234167

[51] Int. Cl.$^5$ ............................................ G06F 15/62

[52] U.S. Cl. .................................. 395/150; 395/151; 345/17; 345/141; 345/144

[58] Field of Search ................ 395/150, 151; 340/728, 340/730, 731, 735; 345/144, 141, 142, 143, 17, 26, 127, 130, 195; 358/261.1; 382/9, 47

[56] References Cited

U.S. PATENT DOCUMENTS

| | | | |
|---|---|---|---|
| 4,254,468 | 3/1981 | Craig | 364/523 |
| 4,675,833 | 6/1987 | Cheek et al. | 364/523 |
| 4,682,189 | 7/1987 | Purdy et al. | 364/523 |
| 4,931,953 | 6/1990 | Uehara et al. | 364/518 |
| 4,942,390 | 7/1990 | Do et al. | 340/735 |
| 4,990,903 | 2/1991 | Cheng et al. | 340/731 |

FOREIGN PATENT DOCUMENTS

| | | |
|---|---|---|
| 13825/88 | 6/1988 | Australia . |
| 34584/89 | 5/1990 | Australia . |
| 0196656 | 10/1986 | European Pat. Off. . |
| PCT/AU86/-00082 | 10/1986 | PCT Int'l Appl. . |

*Primary Examiner*—Gary V. Harkcom
*Assistant Examiner*—Joseph Feild
*Attorney, Agent, or Firm*—Frishauf, Holtz, Goodman & Woodward

[57] ABSTRACT

A character pattern forming apparatus has a ROM, a RAM, and a CPU. The ROM includes a first memory area for storing a plurality of segment data respectively designating different segments of a character each segment having one or more dots arranged in a row and column of a pattern. The first memory also stores predetermined arrangement forms for forming line patterns. A second memory area of the ROM stores a plurality of character fonts each having a plurality of line pattern data which respectively specify a type segment forming a basis for each line pattern, and a dimension and an arrangement of said line patterns. The RAM includes a third memory area in which line patterns for at least one character are stored. The CPU reads from the second memory area a character font of a character to be formed, reads from the first memory area segment data specified by each of the line pattern data for the character font. The CPU determines the number of segments of said segment data needed for determining a size of the specified line patterns. The CPU forms the specified line patterns by arranging a needed number of the segments in said third memory area that correspond to the specified pattern arrangement, thereby forming a character pattern in combination with the line patterns arranged in the third memory area.

6 Claims, 7 Drawing Sheets

APPARATUS FOR FORMING CHARACTER PATTERNS WITH LINE SEGMENTS

This application is a continuation of application Ser. No. 07/577,897, filed Sep. 5, 1990, now abandoned.

BACKGROUND OF THE INVENTION

1. Field of the Invention

The present invention relates to a character pattern forming apparatus which forms large character patterns for printing or display.

2. Description of the Related Art

A general label printer incorporates a font memory for storing a plurality of character fonts, a processor which reads character fonts from the font memory in correspondence with characters to be printed converts them into character patterns of a desired format, a buffer memory which stores the character patterns generated by this conversion, and a printing unit which is driven in accordance with the character patterns stored in the buffer memory. Normally, the character font is classified into the dot-matrix form and the outline form.

The dot-matrix form character font is represented by dots composing a character, whose distribution is in arrays of "1" or "0" in the matrix as shown in FIG. 1. On the other hand, the outline-form character font is represented by points which are sequentially connected to each other by straight lines in a frame as shown in FIG. 2 for making up outlines of a character, and a point which is located within the inner region of the outlines and given for coating the inner region. Each point is designated by a set of a point number, X-coordinate, Y-coordinate, and attribute which are expressed in numerical values. Table 1 shows an example of such an outline-form character font.

TABLE 1

| Point No. | X-coordinate | Y-coordinate | Attribute |
|---|---|---|---|
| P1 | 25 | 20 | 1 |
| P2 | 25 | 110 | 2 |
| P3 | 50 | 110 | 2 |
| P4 | 50 | 80 | 2 |
| P5 | 65 | 70 | 2 |
| P6 | 80 | 110 | 2 |
| P7 | 100 | 110 | 2 |
| P8 | 70 | 55 | 2 |
| P9 | 105 | 20 | 2 |
| P10 | 75 | 20 | 2 |
| P11 | 50 | 50 | 2 |
| P12 | 50 | 20 | 2 |
| P13 | 25 | 20 | 3 |
| P14 | 30 | 60 | 0 |

In the attribute column in Table 1, "1" designates an original point, "2" an intermediate point, "3" a terminal point, of the outline, and "0" designates a point in the inner region of the outline, respectively.

For example, when issuing a cargo label for executing a door-to-door cargo delivery service, it is required that the destination or addressee be printed on the label in very large characters for quick visual identification. This demand can be materialized by setting a desired magnification rate on the printing format and magnifying character fonts read from the font memory according to the magnification rate. Nevertheless, when the available character fonts are in the dot-matrix form, the magnification brings about emphasizes on the steps formed in stairway oblique portions of the outline as shown in FIG. 1, thus visually degrading character quality. Although the outline-form character font is free from degradation of character quality, compared to the dot-matrix form, the outline-form character font requires much time for preparing the printing operation.

When establishing a condition in which extremely large characters must be printed out in a very short preparatory period without causing the character quality to be degraded, there is an idea to satisfy this condition by newly providing dot-matrix form character fonts solely for printing large characters in order that the new character fonts can be stored in a font memory together with ordinary character fonts prepared for printing normal characters. However, storage of large character fonts by itself requires a large memory. Furthermore, if these large character fonts are to be prepared for a variety of characters such as alphabet letters and numerals, the font memory needs to significantly expand storage capacity.

SUMMARY OF THE INVENTION

An object of the invention is to provide a character pattern forming apparatus which is capable of forming large character patterns in a short preparatory period without lowering character quality and also dispensing with expansion of memory capacity for forming large character patterns.

The above object can be achieved by a character pattern forming apparatus which comprises a memory section including a first memory area for storing a plurality of segment data respectively designating different segments each having one or more dots arranged in one of column and row directions and predetermined arrangement forms for forming line patterns, a second memory area for storing a plurality of character fonts each composed of a plurality of line pattern data which respectively specify a type segment forming a basis for each line pattern, and a dimension and an arrangement of said line patterns, and a third memory area in which line patterns for at least one character are stored; and a processing circuit for reading from the second memory area a character font of a character to be formed; reading from the first memory area segment data specified by each of the line pattern data for the character font, determining the number of segments of the segment data which is needed for determining sizes of the specified line patterns, forming the specified line patterns by arranging a needed number of the segments in the third memory area in correspondence with the specified pattern arrangement, thereby forming a character pattern in combination with the line patterns arranged in the third memory area.

According to this character pattern forming apparatus, character font is used for ruling a plurality of line patterns for composing character patterns, in which each line pattern can be generated by placing segments represented by the segment data from the first memory area. In this case, memory capacity needed for storing the character font and the segment data is not dependent on the magnitude of the character pattern, but a very large character pattern can be formed with a small memory capacity. Compared to a process for developing the outline-form character font, the process for aligning segments can easily be executed without requiring much time for preparing the printing operation. Furthermore, since the segments can be placed according to a predetermined aligning format, steps present in oblique portions of a character are not expanded in forming a large character pattern. In consequence, the apparatus of the invention securely prevents character quality from being degraded by expansion of the stepwise difference in the oblique portions of the character.

DETAILED DESCRIPTION OF THE PREFERRED EMBODIMENT

The label printer according to one embodiment of the invention will be described with reference to FIGS. 3 to 10.

The label printer is used for issuing cargo labels, for example, for door-to-door cargo delivery service. The label printer is designed so that extremely large characters can be printed on labels.

Figure 1:
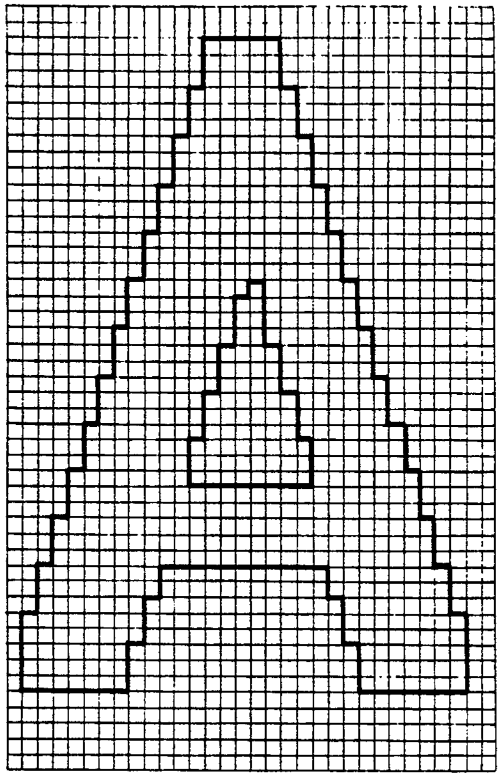
FIG. 1 is a chart showing "A" displayed by means of the dot-matrix format character font.
Figure 2:
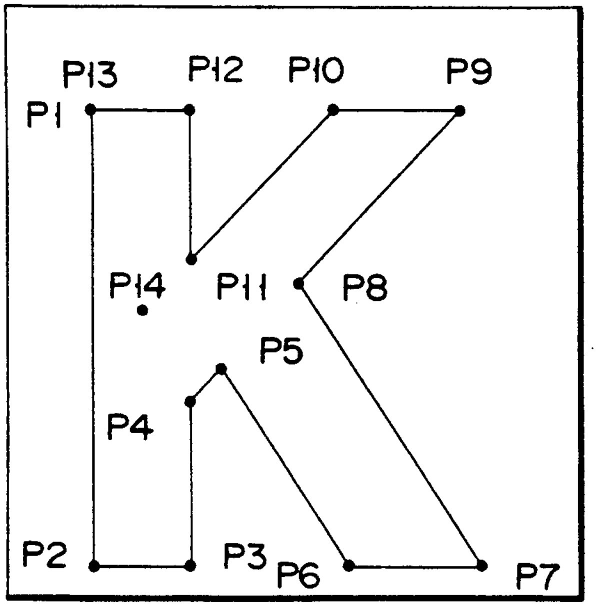
FIG. 2 is a chart showing "K" displayed by means of the outline format character font.
Figure 3:
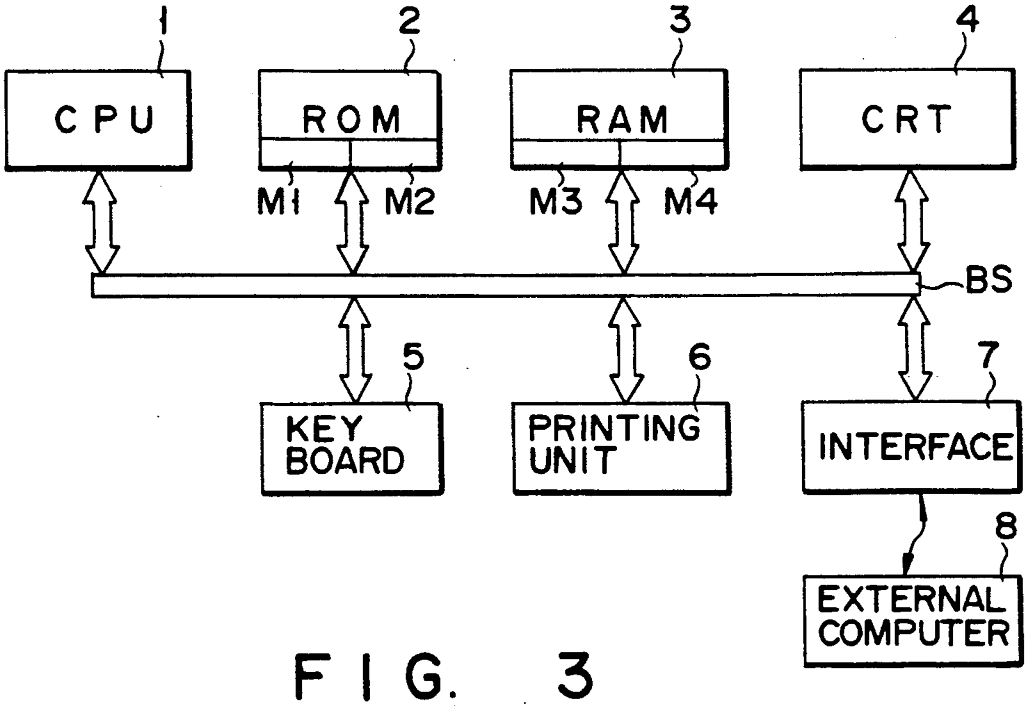
FIG. 3 is a simplified circuit block diagram showing the structure of a label printer according to one embodiment of the invention.
Figure 4A:
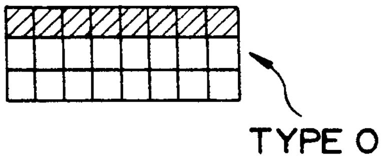
FIGS. 4A to 4J are charts designating "10" type segments and aligning formats.
Figure 4B:
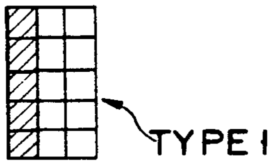
Figure 4C:
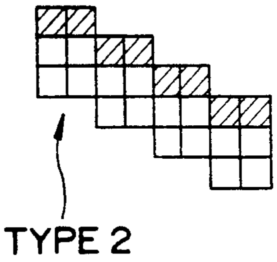
Figure 4D:
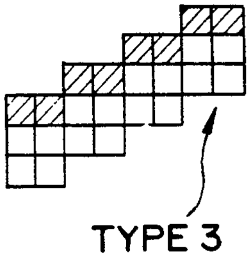
Figure 4E:
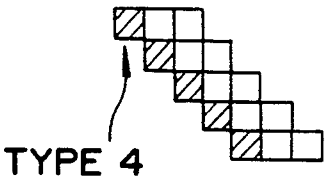
Figure 4F:
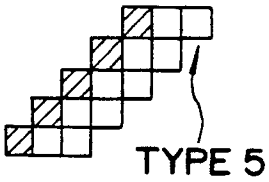
Figure 4G:
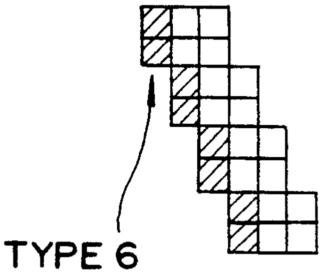
Figure 4H:
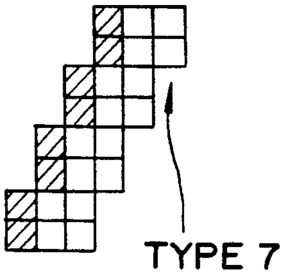
Figure 4I:
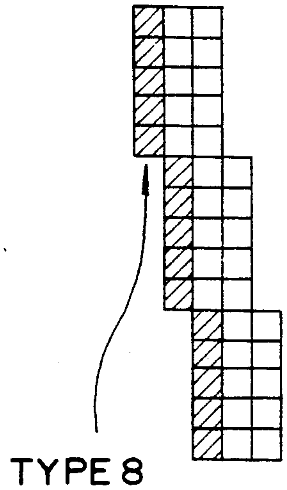
Figure 4J:
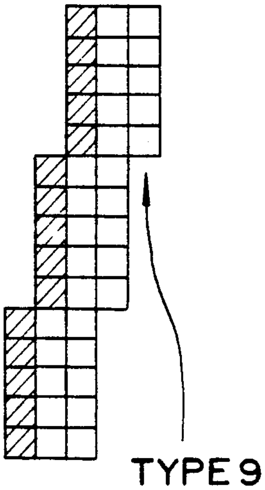

FIG. 3 illustrates a circuit block diagram of the label printer. The label printer is provided with a CPU 1, a ROM 2, a RAM 3, a display unit 4, a keyboard 5, a printer unit 6, and an interface 7. These components are connected to each other via a bus line BS composed of an address bus, a data bus, and a control bus. The interface 7 is connected to an external computer 8 via signal cables. The ROM 2 contains an area Ml for storing a plurality of segment data, an area M2 for storing a plurality of character fonts, and an area for storing a control program for the CPU 1. These segment data respectively designate a variety of segments which are composed of one or more dots placed in one direction among respective column and row directions and provided with a predetermined array format for composing line patterns. These character fonts are composed of segment data designating basic segments for composing one line pattern, and a plurality of line pattern data specifying the size and arrangement of this line pattern.

The CPU 1 executes a variety of mathematical operations and control operations by executing control programs stored in the RAM 2. The RAM 2 stores input/output data of the CPU 1 and comprises an input buffer area M4 for storing character codes received as printing data from either the keyboard 5 or the external computer 8 and an output buffer area M3 for storing character patterns composed of a plurality of line patterns. The character pattern is used for driving the display unit 4 and the printer unit 6. The display unit 4 displays characters corresponding to the character patterns. The printer unit 6 prints characters corresponding to these character patterns, on a label.

FIGS. 4A through 4J respectively show 10 types of segments designated by the segment data stored in the ROM 2. As shown in Table 2 those segment data are composed of a plurality of data which respectively designate a type number TYPE, a length YL in the direction of column, a length XL in the direction of row, an array format INC, and a direction DIR in which segments may be thickened. Blank blocks shown in FIGS. 4A through 4J respectively designate dots to be provided for thickening the segments.

TABLE 2

| TYPE | YL | XL | INC | DIR |
|---|---|---|---|---|
| 0 | 1 | 8 | 0 | 1/0 |
| 1 | 5 | 1 | 0 | 0/1 |
| 2 | 1 | 2 | 1 | 1/0 |
| 3 | 1 | 2 | 2 | 1/0 |
| 4 | 1 | 1 | 3 | 0/1 |
| 5 | 1 | 1 | 4 | 0/1 |
| 6 | 2 | 1 | 3 | 0/1 |
| 7 | 2 | 1 | 4 | 0/1 |
| 8 | 5 | 1 | 3 | 0/1 |
| 9 | 5 | 1 | 4 | 0/1 |

The lengths YL and XL are designated by the number of dots. The array format INC rules the alignment of the identical type segments as follows. When the array format INC is "0", a following segment is set in the same row or column as a preceding segment. When the array format INC is "1", a following segment is set one row below a preceding segment at the right side thereof. When the array format INC is "2", a following segment is set one row below a preceding segment at the left side thereof. When the array format INC is "3", a following segment is set below a preceding segment in the right side column thereof. When the array format INC is "4", a following segment is set below a preceding segment in the left side column thereof. Regarding the DIR, 1/0 designates that the thickness of the segment can be expanded in the direction of column, whereas it cannot be expanded in the direction of row. 0/1 designates that the thickness of the segment cannot be expanded in the direction of column, whereas the thickness of the segment can be expanded in the direction of row.

TABLE 3

| | X (mm) | Y (mm) | TYPE | LONG (mm) | WIDE (mm) |
|---|---|---|---|---|---|
| LP1 | 14 | 0 | 9 | 75 | 5 |
| LP2 | 19 | 0 | 8 | 75 | 5 |
| LP3 | 11 | 40 | 1 | 3 | 16 |

Table 3 designates a character font of "A" as an example of the character fonts stored in the ROM 2. This character font is composed of line pattern data LP1, LP2, and LP3, each of which specifies coordinates X and Y making up the original point for setting a line pattern, type number TYPE of basic segments for making up the line pattern, length LONG in the Y-axial direction and width WIDE in the X-axial direction of the line pattern. In this embodiment, the Y-axial direction and the X-axial direction respectively accord with the directions of the row and column of the segments. These line pattern data LP1, LP2, and LP3 are used for forming three line patterns shown in FIG. 5 by the same reference numerals.

Figure 6:
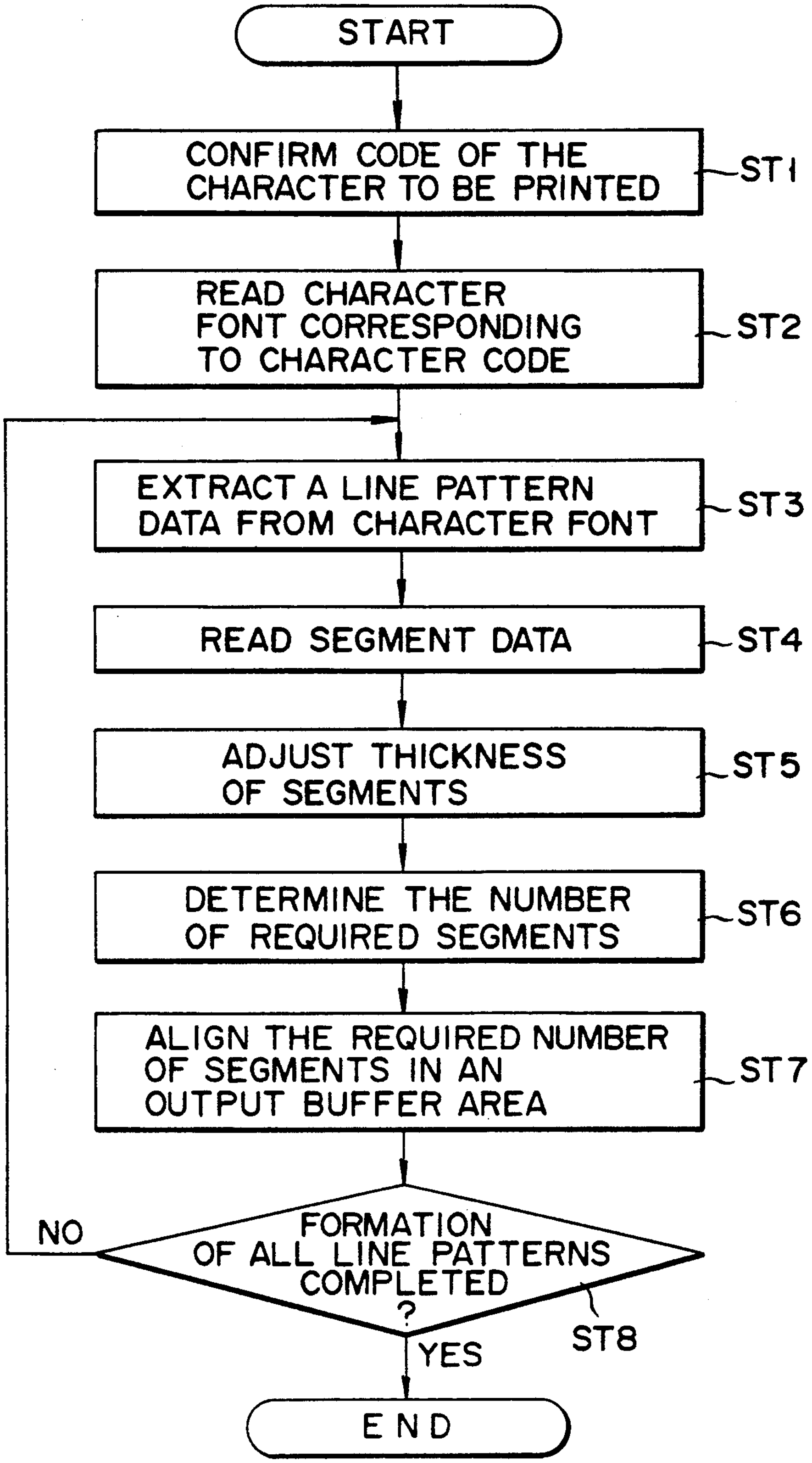
FIG. 6 is a flowchart explanatory of the character forming operation of the label printer shown in FIG. 3.

Referring now to the flowchart shown in FIG. 6, sequential steps for forming character patterns will be described.

Figure 5:
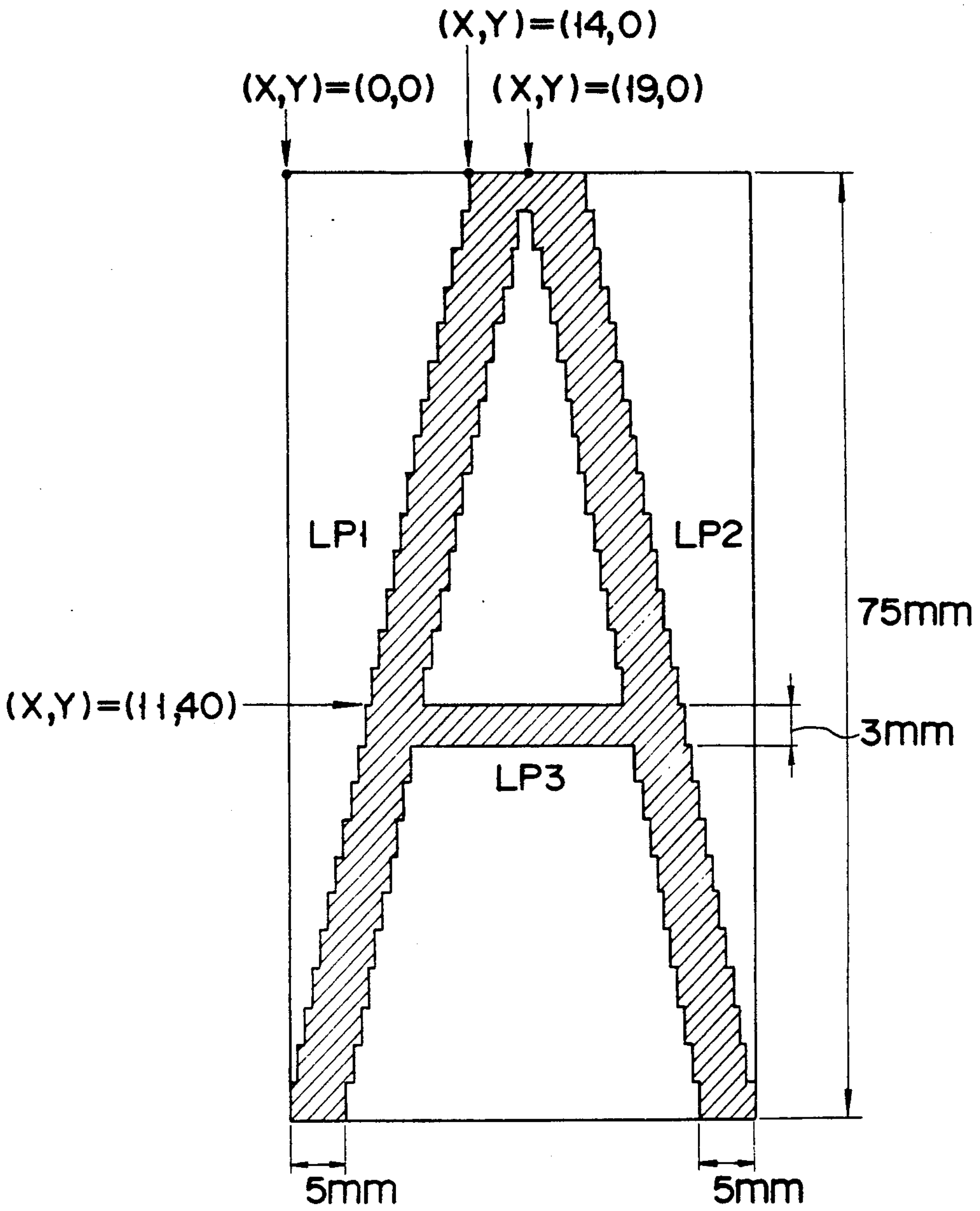
FIG. 5 is a chart showing a character pattern corresponding to character "A"

When the character formation process is started, the CPU 1 confirms the code of the character to be printed in step ST1, the character font corresponding to the character code is read from the area M2 of the ROM 2 in step ST2. Next, in step ST3, a line-pattern data is extracted from this character font, and the segment data specified by the above line pattern data is read from the area M1 of the ROM 2 in step ST4. The thickness of the segment of the segment data is adjusted in correspondence with the width WIDE of the line pattern specified by the line pattern data in step ST5, and the number of segments needed for composing a line pattern is determined in correspondence with the length LONG of the line pattern specified by the line pattern data in step ST6. Next, in step ST7, those segments having an adjusted width are aligned in the output buffer area of the RAM 3 by the needed number from the original point corresponding to the coordinates specified by the line pattern data. While step ST7 is underway, it is checked whether all the line patterns are formed, or not. After completing formation of the whole line patterns, a character pattern is formed by the combination of these line patterns stored in the output buffer area, as is shown in FIG. 5. The character pattern forming process then terminates. If there are any line patterns which are not yet formed, in order to extract the next line pattern data, operation mode is brought back to step ST3 to follow up those sequential processes over again.

Next, an example of forming a character pattern "A" is described below.

When the line pattern data LP1 is extracted from the character font, the CPU 1 identifies that the segment corresponds to TYPE 9 having 5 mm of width WIDE, and then adjusts the length of this segment in the direction of X axis i.e., in the direction of row to have:

$$5\ (mm) \div (0.6\ (mm/dot)) \approx 8\ (dots).$$

Since the segment is of TYPE 9, the length in the direction of Y axis, i.e., in the direction of column is fixed at 5 dots. In consequence, this segment is provided with 8 dots×5 dots of dot matrix.

Next, the CPU 1 determines the number of segment needed for forming a line pattern. In this case, since the length LONG is 75 mm and the length of the segment in the Y-axial direction is 5 dots, the CPU 1 determines that 25 segments are needed based on the computation shown below.

$$75\ (mm) \div \{0.6\ (mm/dot) \times 5\ (dots)\} \approx 25$$

Figure 7A:
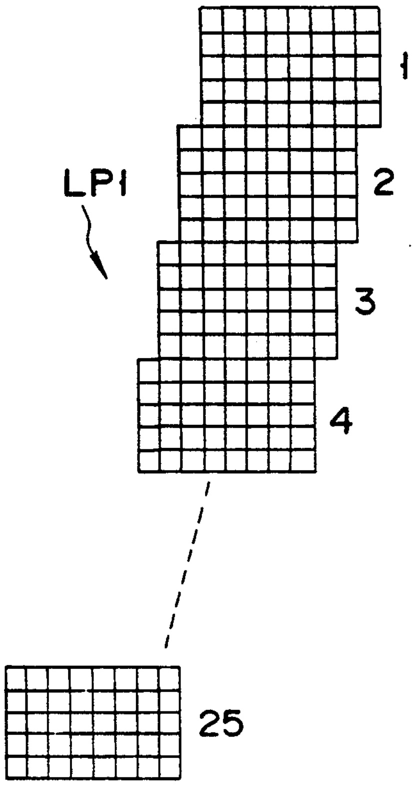
FIGS. 7A to 7C are charts showing three line patterns combined for composing character "A" for example.
Figure 7B:
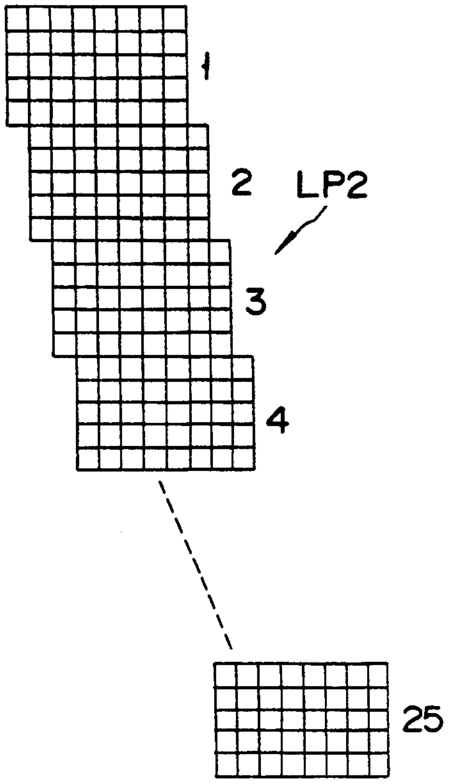

Next, applying the coordinates (X, Y)=(14, 0) to the original point for the formation of a line pattern, as shown in FIG. 7A, 25 segment patterns of TYPE 9 are aligned with 8 dots×5 dots of dot matrix.

Next, the line pattern data LP2 is extracted from the character font. Like the case of the line pattern data LP1, the dot matrix of a segment is formed by 8 dots×5 dots so that 25 segment patterns are needed. 25 segments of TYPE 8 are placed with a dot matrix of 8 dots×5 dots in the manner shown in FIG. 7B with the original point for the formation of line patterns set at coordinates (X, Y)=(19, 0).

Figure 7C:
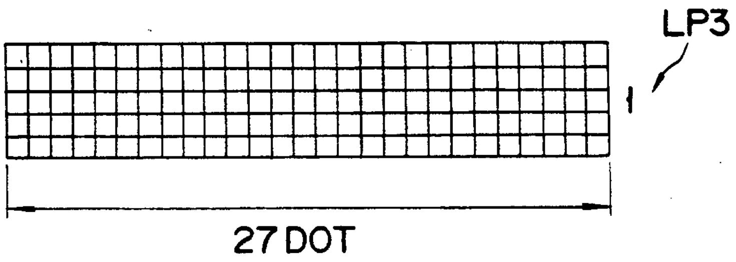

Next the line pattern data LP3 is extracted from the character font. In this case, each segment is a dot matrix of 5 dots×27 dots, and one such segment is required. Applying coordinates (X, Y)=(11, 40) to the original point for the formation of line patterns, as shown in FIG. 7C, one segment of TYPE 1 is set with a dot matrix of 5 dots×27 dots. By executing the processes mentioned above, formation of a character pattern "A" is completed. The character pattern "A" shown in FIG. 5 is not the actual size. However, it is apparent from FIG. 5 that a clear character composed of three line patterns can be produced without generating poor visible effect otherwise caused by stepwise difference in the oblique portions of the character. The apparatus embodied by the invention is ideally suited for printing large characters of simple configuration like alphabet letters and numerals.

Figure 8:
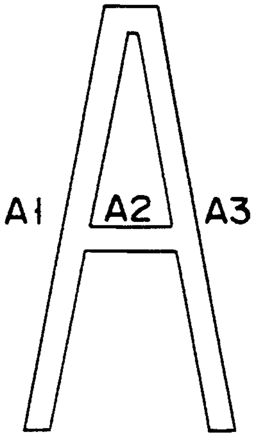
FIGS. 8 to 10 schematically illustrate character patterns "A", "B", and "C".
Figure 9:
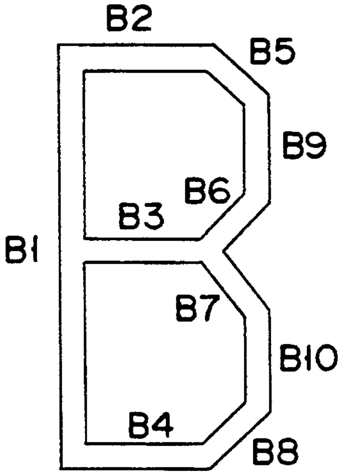
Figure 10:
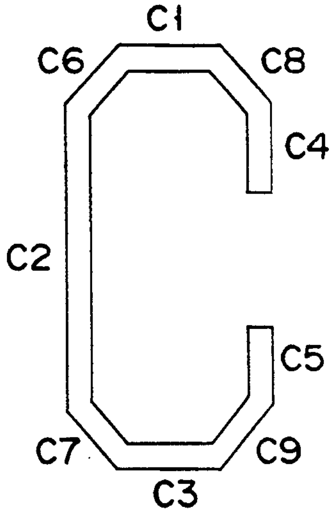

Furthermore, by provision of character fonts, the apparatus embodied by the invention can easily form optional character patterns for printing or display. FIGS. 8 through 10 respectively show simple configurations of characters A, B, and C. Table 4 presents a variety of character fonts prepared for the formation of these character patterns. In this case, character pattern "A" is composed of a combination of the line patterns $A_1$, $A_2$, and $A_3$. Character pattern "B" is composed of a combination of the line patterns $B_1$ through $B_{10}$. Character pattern "C" is composed of a combination of line patterns $C_1$ through $C_9$.

TABLE 4

| | X (mm) | Y (mm) | TYPE | LONG (mm) | WIDE (mm) |
|---|---|---|---|---|---|
| $A_1$ | 14 | 0 | 9 | 75 | 5 |
| $A_2$ | 19 | 0 | 8 | 75 | 5 |
| $A_3$ | 11 | 40 | 1 | 3 | 16 |
| $B_1$ | 0 | 0 | 1 | 75 | 5 |
| $B_2$ | 5 | 0 | 1 | 5 | 23 |
| $B_3$ | 5 | 35 | 1 | 5 | 22 |
| $B_4$ | 5 | 70 | 1 | 5 | 23 |
| $B_5$ | 23 | 0 | 4 | 10 | 5 |
| $B_6$ | 33 | 29 | 5 | 10 | 5 |
| $B_7$ | 23 | 35 | 4 | 10 | 5 |
| $B_8$ | 33 | 64 | 5 | 10 | 5 |
| $B_9$ | 33 | 10 | 1 | 19 | 5 |
| $B_{10}$ | 33 | 46 | 1 | 19 | 5 |
| $C_1$ | 10 | 0 | 1 | 5 | 18 |
| $C_2$ | 0 | 10 | 1 | 55 | 5 |
| $C_3$ | 10 | 70 | 1 | 5 | 18 |
| $C_4$ | 33 | 10 | 1 | 15 | 5 |
| $C_5$ | 33 | 50 | 1 | 15 | 5 |
| $C_6$ | 10 | 0 | 5 | 10 | 5 |
| $C_7$ | 0 | 64 | 4 | 10 | 5 |
| $C_8$ | 23 | 0 | 4 | 10 | 5 |
| $C_9$ | 23 | 64 | 5 | 10 | 5 |

As is clear from the above description, since the apparatus of this embodiment can optionally form a variety of character patterns by combining line patterns with each other, the apparatus can securely decrease the amount of data needed for forming character patterns to about one-tenth the conventional requirement, and yet, it can print clear characters after a very short preparatory time.

What is claimed is:

1. A character pattern forming apparatus for forming a character from a plurality of straight line segments, each of said plurality of straight line segments being positioned in one of a horizontal, vertical and oblique direction in an X-Y plane, comprising:

line segment memory means for storing a plurality of line segment data, a first one of said plurality of line segment data defining a first dot pattern that forms a first portion of a first straight line segment;

said line segment memory means further storing data representing a width direction in which said first dot pattern is to be widened to increase a width of said first portion of said first straight line segment, and said line segment memory means further storing an arrangement format for arranging other dot patterns that are identical to said first dot pattern and that are to form other portions of said first straight line segment, to be adjacent to each other in said one of said horizontal, vertical and oblique directions in which said first straight line segment is to be positioned to form an overall pattern of said first straight line segment;

font memory means for storing a plurality of character fonts, each character font designating a set of straight line segment data corresponding to said plurality of straight line segments, including said first straight line segment, that are to form said character in a selected one of said character fonts;

said font memory means further storing a length, a width and an end position for each of said plurality of straight line segments, including said first straight line segment, forming said character in said selected one of said character fonts; and processing means for selecting said one of said character fonts stored in said font memory means, for retrieving said set of straight line segment data designated by said selected one of said character fonts from said line segment memory means, and for forming an overall pattern of said first straight line segment which corresponds to at least a portion of said retrieved set of straight line segment data; and wherein a width direction of said first dot pattern defined by said at least a portion of said retrieved set of straight line segment data is widened to conform with a stored first straight line segment width of said selected character font selected by said processing means, such that said other identical dot patterns that are identical to said first dot pattern and have a common adjusted width that is equal to a width of said first dot pattern, are arranged in said one of said horizontal, vertical and oblique directions in accordance with said arrangement format stored in said line segment memory means; and said processing means includes determining means for determining how many of said other identical dot patterns are required to form said first straight line segment based on the stored line segment length for said first straight line segment stored in said font memory means and designated by said selected one of said character fonts;

said determining means further determining a last dot position, that corresponds to said stored end position for said first straight line segment, whereby said character is obtained from a combination of overall patterns of line segments obtained from said retrieved set of straight line segment data.

2. A character pattern forming apparatus according to claim 1, wherein each set of segment data includes:

discrimination data for representing a type of dot pattern;

dot pattern forming data for representing a number of dots of a pattern in a row direction and a number of dots of said pattern in a column direction;

said width direction data representing a direction in which said width of said first dot pattern is to be widened; and format data representing said oblique direction for each of the identical dot patterns that are to be arranged in said oblique direction.

3. A character pattern forming apparatus according to claim 1, wherein each character font comprises a plurality of line segment data, said line segment data respectively including:

selection data representing a dot pattern type selected to form a line segment;

length data representing a length for said line segment;

width data representing a width for said line segment; and position data representing a row and a column coordinate for an original point of the line segment, said original point being a point at the beginning of said line segment.

4. A character pattern forming apparatus according to claim 1, further comprising first buffer memory means for storing at least one character pattern provided by said processing means.

5. A character pattern forming apparatus according to claim 4, further comprising second buffer memory means for storing at least one character code specifying the selected character font selected by said processing means.

6. A character pattern forming apparatus according to claim 5, wherein said segment and font memory means are provided in a read only memory, and said first and second buffer means are provided in a random access memory.

* * * * *